(12) United States Patent
Yamashita et al.

(10) Patent No.: US 10,661,971 B2
(45) Date of Patent: May 26, 2020

(54) VACUUM HEAT INSULATING CONTAINER

(71) Applicant: TOYOTA JIDOSHA KABUSHIKI KAISHA, Toyota-shi, Aichi-ken (JP)

(72) Inventors: Osamu Yamashita, Toyota (JP); Takaaki Takahashi, Toki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/042,005

(22) Filed: Jul. 23, 2018

(65) Prior Publication Data

US 2019/0062036 A1    Feb. 28, 2019

(30) Foreign Application Priority Data

Aug. 28, 2017    (JP) .................................. 2017-163675

(51) Int. Cl.
  *B65D 81/38*    (2006.01)
  *A47J 41/02*    (2006.01)
  *F27B 5/06*    (2006.01)

(52) U.S. Cl.
  CPC ........ *B65D 81/3841* (2013.01); *A47J 41/028* (2013.01); *F27B 5/06* (2013.01)

(58) Field of Classification Search
  CPC ...... B65D 25/18; B65D 21/0233; B65D 1/40; B65D 81/3841; B65D 81/3837; B65D 81/38; B65D 81/3818; B65D 81/3869; A47J 41/028; A47J 41/022; A47J 41/02
  USPC .......... 220/23.83, 23.89, 592.27, 592.2, 506, 220/62.18
  See application file for complete search history.

(56) References Cited

U.S. PATENT DOCUMENTS

| | | | | |
|---|---|---|---|---|
| 761,548 | A | * | 5/1904 | Sheaff .................... B65D 83/38 222/394 |
| 872,795 | A | * | 12/1907 | Burger ................. B65D 1/0215 215/12.2 |
| 1,055,710 | A | * | 3/1913 | Conroy et al. ........ A47J 41/022 220/592.27 |
| 1,352,844 | A | | 9/1920 | Smith |
| 1,517,978 | A | * | 12/1924 | Giese ................. B65D 81/3841 220/62.18 |
| 1,651,655 | A | * | 12/1927 | Fairfax ................. A47J 41/022 220/592.27 |

(Continued)

FOREIGN PATENT DOCUMENTS

| | | |
|---|---|---|
| CN | 201849856 U | 6/2011 |
| DE | 11 2005 000 873 T5 | 3/2007 |

(Continued)

*Primary Examiner* — Robert J Hicks
(74) *Attorney, Agent, or Firm* — Sughrue Mion, PLLC (57) ABSTRACT

A vacuum heat insulating container 1 includes an outer tube 2 having a bottom and an inner tube 3 having a bottom and an inner tube 3 having a bottom, the outer tube 2 and the inner tube 3 being arranged in such a way that the central axes thereof being a horizontal direction, an opening end of the outer tube 2 and an opening end of the inner tube 3 being bonded to each other, and a depressurized sealed space 8 being formed between the outer tube 2 and the inner tube 3, in which the vacuum heat insulating container further includes a load receiving part 7 for causing the outer tube 2 to support the inner tube 3, and the location of the load receiving part 7 in a vertical direction coincides with the location of the central axis of the outer tube 2.

5 Claims, 12 Drawing Sheets

(56) References Cited

U.S. PATENT DOCUMENTS

| | | | |
|---|---|---|---|
| 7,344,045 B2 * | 3/2008 | Harper | F17C 1/00 220/560.09 |
| 8,991,636 B2 * | 3/2015 | Verhulst | F17C 13/001 220/23.89 |
| 2006/0169704 A1 | 8/2006 | Brunnhofer | |
| 2018/0141740 A1 | 5/2018 | Yamashita | |
| 2018/0224053 A1 * | 8/2018 | Yamashita | F27D 3/0025 |

FOREIGN PATENT DOCUMENTS

| | | |
|---|---|---|
| GB | 2 434 440 A | 7/2007 |
| JP | 2011-219125 A | 11/2011 |
| JP | 2018-079972 A | 5/2018 |
| WO | 2004/074737 A1 | 9/2004 |
| WO | 2005/100210 A1 | 10/2005 |

* cited by examiner

PRIOR ART

VACUUM HEAT INSULATING CONTAINER

CROSS REFERENCE TO RELATED APPLICATIONS

This application is based upon and claims the benefit of priority from Japanese patent application No. 2017-163675, filed on Aug. 28, 2017, the disclosure of which is incorporated herein in its entirety by reference.

BACKGROUND

The present disclosure relates to a vacuum heat insulating container.

A vacuum heat insulating container in which an inner tube including a bottom is arranged inside an outer tube that also includes a bottom, and a vacuum space is formed between the inner tube and the outer tube has been known. Japanese Unexamined Patent Application Publication No. 2011-219125 discloses a vacuum heat insulating container in which a metallic inner tube and a metallic outer tube are integrally connected to each other at opening parts thereof.

SUMMARY

Figure 10:
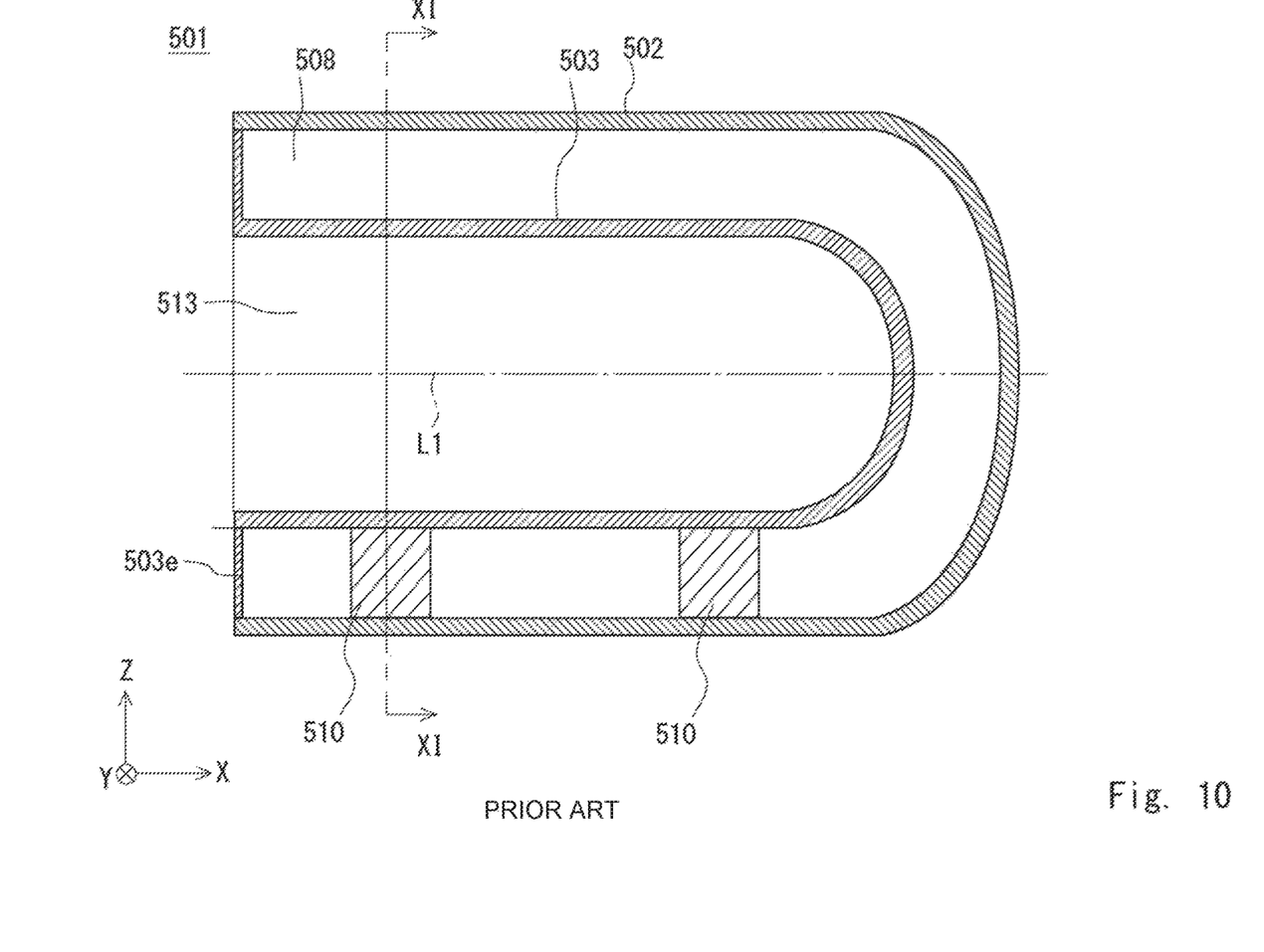
FIG. 10 is a schematic view showing one example of a vacuum heat insulating container according to the problem to be solved by the present disclosure.
Figure 11:
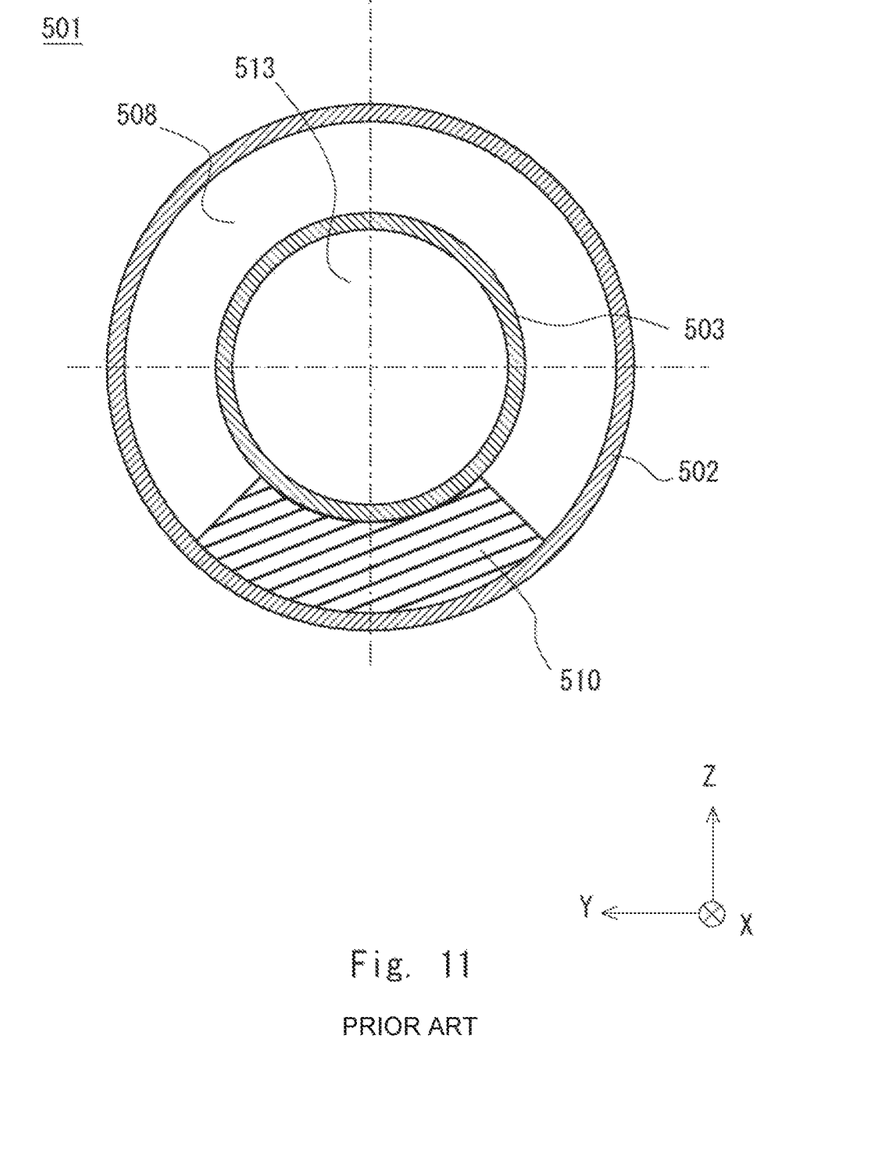
FIG. 11 is a cross-sectional view taken along the line XI-XI of FIG. 10.

FIG. 10 is a schematic view showing one example of a vacuum heat insulating container according to a problem to be solved by the present disclosure. FIG. 11 is a cross-sectional view taken along the line XI-XI of FIG. 10. The right-handed xyz coordinates shown in these drawings are merely examples for the sake of convenience to explain the positional relation of components.

As shown in FIGS. 10 and 11, a vacuum heat insulating container 501 includes an outer tube 502 and an inner tube 503, each including a bottom. Further, an end part of the outer tube 502 and an end part of the inner tube 503, the end parts being on a side opposite to the bottoms in an axial direction, are open. The outer tube 502 and the inner tube 503 are made of metal such as stainless steel. The inner tube 503 is arranged inside the outer tube 502 in such a way that the central axis of the inner tube 503 coincides with the central axis of the outer tube 502. Further, the outer tube 502 and the inner tube 503 are arranged in such a way that the central axes thereof are in a horizontal direction. A heating space 513 is inside the inner tube 503. The outer tube 502 and the inner tube 503 are bonded to each other via a ring-shaped bonding part 503e at opening ends of the outer tube 502 and the inner tube 503, the opening ends being on a side opposite to the bottoms, and a depressurized sealed space 508 is formed between the outer tube 502 and the inner tube 503. According to this structure, heat can be prevented from being transferred from the inner tube 503 to the outer tube 502. A base 510 configured to support the load of the inner tube 503 and the load of heated components contained in the heating space 513 is arranged below the vertically lower part of the inner tube 503. The base 510 is formed of a material having a thermal conductivity lower than that of the material of the outer tube 502 and the inner tube 503. The base 510 is formed of, for example, heat resistant bricks.

Figure 12:
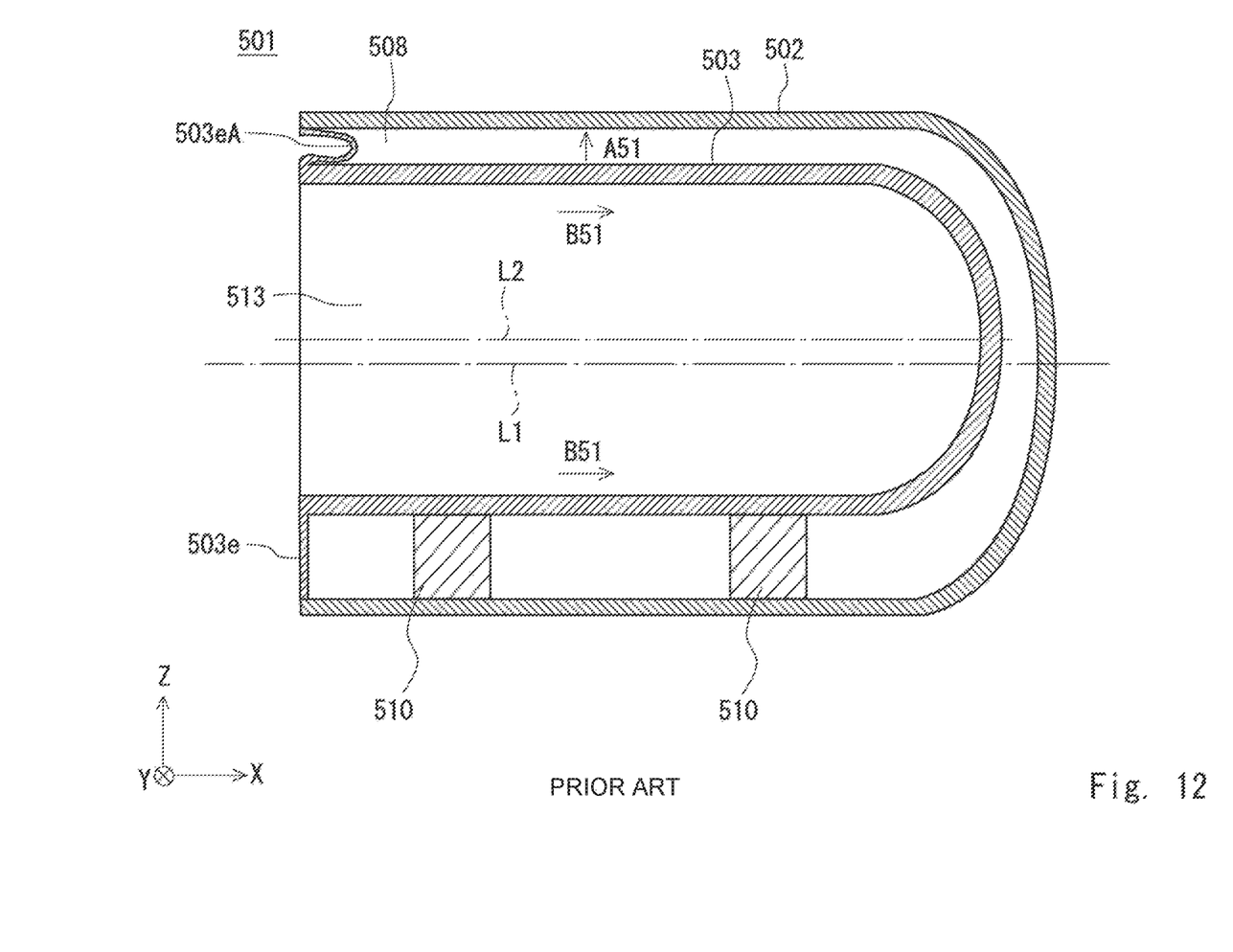
FIG. 12 is a schematic view showing a state of a vacuum heat insulating container according to the problem to be solved by the present disclosure when heating is performed in a heating space.

FIG. 12 is a schematic view showing a state of the vacuum heat insulating container 501 when heating is performed in the heating space 513. As shown in FIG. 12, when heating is performed in the heating space 513, the inner tube 503 is heated and is thermally expanded in the radial direction (arrow A51) and the axial direction (arrow B51). On the other hand, since the outer tube 502 is thermally insulated from the inner tube 503 by the depressurized sealed space 508, the outer tube 502 barely expands thermally when the inner tube 503 is heated. Further, since the vertically lower part of the inner tube 503 is fixed by the base 510 in the vacuum heat insulating container 501, the inner tube 503 is thermally expanded in the vertically upward direction (arrow A51) with respect to the location supported by the base 510 when it is heated. Therefore, the distance between the inner tube 503 and the outer tube 502 becomes short only in the vertically upper part. That is, a central axis L2 of the inner tube 503 is deviated in the vertically upward direction with respect to a central axis L1 of the outer tube 502. Therefore, when the inner tube 503 is heated up to a high temperature (e.g., 1000° C.) and a temperature difference between the inner tube 503 and the outer tube 502 becomes large, a distortion of the deformation of the inner tube 503 due to thermal expansion is concentrated only in a part 503eA provided in the vertically upper part of the bonding part 503e. Accordingly, when the vacuum heat insulating container 501 is repeatedly used, the part 503eA provided in the vertically upper part of the bonding part 503e is repeatedly distorted, which may result in damage of the bonding part 503e.

The present disclosure has been made in view of the aforementioned circumstances and aims to provide a vacuum heat insulating container capable of preventing the central axis of the inner tube from being deviated from the central axis of the outer tube when the inner tube is heated.

The present disclosure provides a vacuum heat insulating container including an outer tube having a bottom and an inner tube that has a bottom and is arranged inside the outer tube in such a way that a central axis of the inner tube coincides with a central axis of the outer tube, the outer tube and the inner tube being arranged in such a way that the central axes thereof being a horizontal direction, an opening end of the outer tube and an opening end of the inner tube being bonded to each other, the opening end of the outer tube and the opening end of the inner tube being provided on a side opposite to the bottoms thereof, and a depressurized sealed space being formed between the outer tube and the inner tube, in which the vacuum heat insulating container further includes a load receiving part for causing the outer tube to support the inner tube, and the location of the load receiving part in a vertical direction coincides with the location of the central axis of the outer tube.

When the inner part of the inner tube is heated, the inner tube is thermally expanded in the radial direction and the axial direction. On the other hand, since the outer tube is thermally insulated from the inner tube by the depressurized sealed space, the outer tube barely expands thermally even when the inside part is heated. The location of the load receiving part in the vertical direction coincides with the location of the central axis of the outer tube. That is, the inner tube is supported by the outer tube using the load receiving part whose location in the vertical direction coincides with the central axis of the outer tube. Therefore, when the inner tube is heated, the central axis of the inner tube is maintained to coincide with the central axis of the outer tube. When the inner tube is heated, the inner tube is thermally expanded to the upper part thereof and the lower part thereof of the vertical direction equally, with the load receiving part being at the center of thermal expansion, whereby it is possible to prevent the central axis of the inner tube from being deviated from the central axis of the outer tube.

Further, the load receiving part may include a first protruding part that protrudes in an outer circumference of the inner tube and a second protruding part that protrudes in an inner circumference of the outer tube and receives the load of the inner tube via the first protruding part. The location of the load receiving part that includes the first protruding part and the second protruding part in the vertical direction coincides with the location of the central axis of the outer tube. The second protruding part receives the load of the inner tube via the first protruding part, whereby the inner tube is thermally expanded to the upper part thereof and the lower part thereof of the vertical direction equally, with the load receiving part being at the center of thermal expansion, when it is heated. According to this structure, it is possible to prevent the central axis of the inner tube from being deviated from the central axis of the outer tube when the inner tube is heated.

Furthermore, the first protruding part may be protruded horizontally on respective sides of the outer circumference of the inner tube, the second protruding part may be protruded horizontally on respective sides of the inner circumference of the outer tube in such a way that the second protruding part is opposed to the first protruding part in a vertical direction, an insertion member formed of a material having a thermal conductivity lower than that of the material of the outer tube and the inner tube may be inserted between the first protruding part and the second protruding part, and the second protruding part may receive the load of the inner tube via the first protruding part and the insertion member. The location of the load receiving part that includes the first protruding part and the second protruding part in the vertical direction coincides with the location of the central axis of the outer tube. The second protruding part receives the load of the inner tube via the first protruding part, whereby the inner tube is thermally expanded to the upper part thereof and the lower part thereof of the vertical direction equally, with the load receiving part being at the center of thermal expansion, when it is heated. According to this structure, it is possible to prevent the central axis of the inner tube from being deviated from the central axis of the outer tube when the inner tube is heated. Further, the insertion member formed of a material having a thermal conductivity lower than that of the material of the outer tube and the inner tube is inserted between the first protruding part and the second protruding part, whereby it is possible to prevent heat from being transferred from the inner tube to the outer tube via the load receiving part.

Further, the first protruding part may be a columnar member and may be protruded in an axial direction in a bottom part of the outer circumference of the inner tube, the second protruding part may be a cylindrical member and may be protruded in an axial direction in a bottom part of the inner circumference of the outer tube, and the first protruding part may be fitted into a cylindrical bore of the second protruding part in such a way that it can be slid. The location of the load receiving part that includes the first protruding part and the second protruding part in the vertical direction coincides with the location of the central axis of the outer tube. The first protruding part is fitted into the cylindrical bore of the second protruding part, whereby the second protruding part is able to receive the load of the inner tube via the first protruding part. The second protruding part receives the load of the inner tube via the first protruding part, whereby the inner tube is thermally expanded to the upper part thereof and the lower part thereof of the vertical direction equally, with the load receiving part being at the center of thermal expansion, when it is heated. According to this structure, it is possible to prevent the central axis of the inner tube from being deviated from the central axis of the outer tube when the inner tube is heated.

Further, the first protruding part may be a plate-like member and may be protruded in an axial direction in such a way that a principal surface of the first protruding part becomes horizontal in a bottom part of the outer circumference of the inner tube, and the second protruding part may be protruded in the axial direction in such a way that a principal surface of the second protruding part is opposed to and contacts the principal surface of the first protruding part in a bottom part of the inner circumference of the outer tube. The location of the load receiving part that includes the first protruding part and the second protruding part in the vertical direction coincides with the location of the central axis of the outer tube. The principal surface of the second protruding part and the principal surface of the first protruding part are made to contact each other, whereby the second protruding part is able to receive the load of the inner tube via the first protruding part. The second protruding part receives the load of the inner tube via the first protruding part, whereby the inner tube is thermally expanded to the upper part thereof and the lower part thereof of the vertical direction equally, with the load receiving part being at the center of thermal expansion, when it is heated. According to this structure, it is possible to prevent the central axis of the inner tube from being deviated from the central axis of the outer tube when the inner tube is heated.

According to the present disclosure, it is possible to prevent the central axis of the inner tube from being deviated from the central axis of the outer tube when the inner tube is heated.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, embodiments of the present disclosure will be explained. The following descriptions and the drawings are omitted and simplified as appropriate for the sake of clarity of description. Throughout the drawings, the same elements are denoted by the same reference symbols, and overlapping descriptions are omitted as appropriate.

First Embodiment

Hereinafter, with reference to the drawings, a first embodiment of the present disclosure will be explained.

Figure 1:
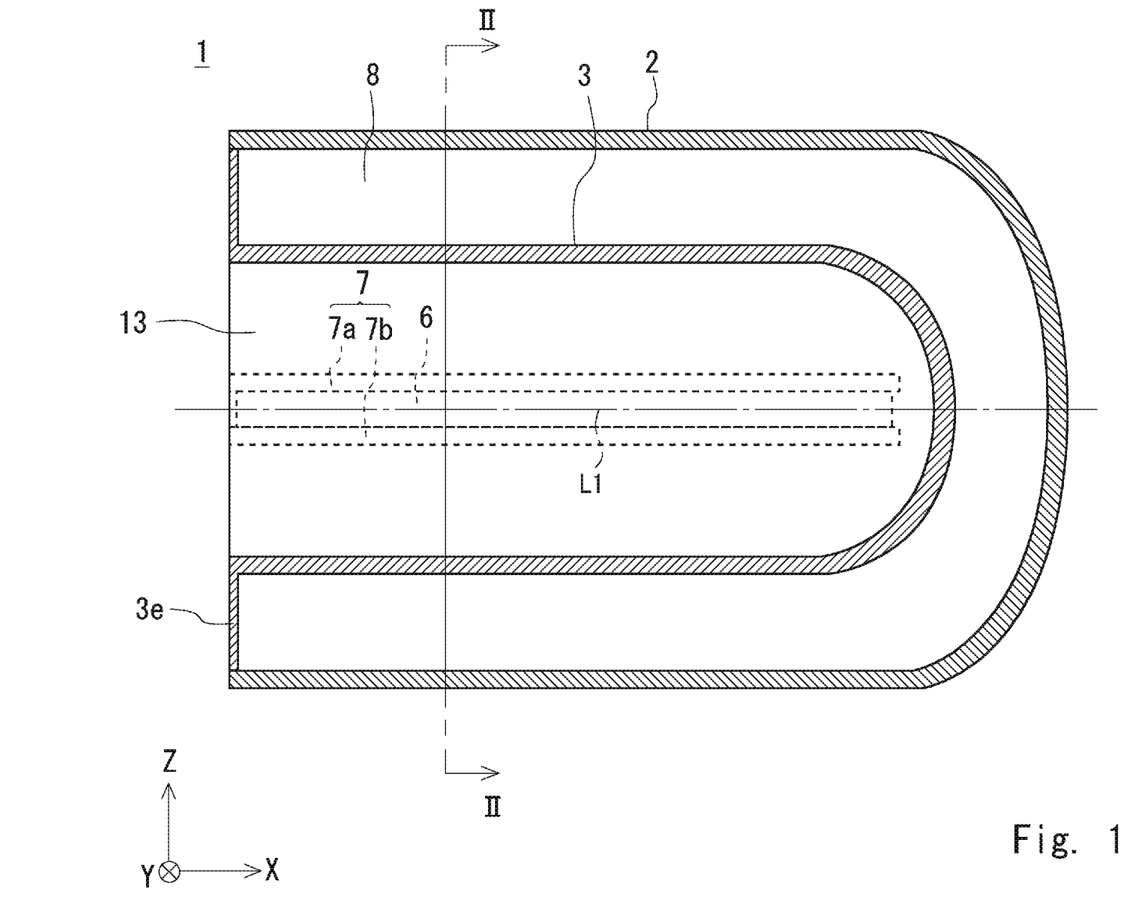
FIG. 1 is a schematic view showing a structure of a vacuum heat insulating container according to a first embodiment.
Figure 2:
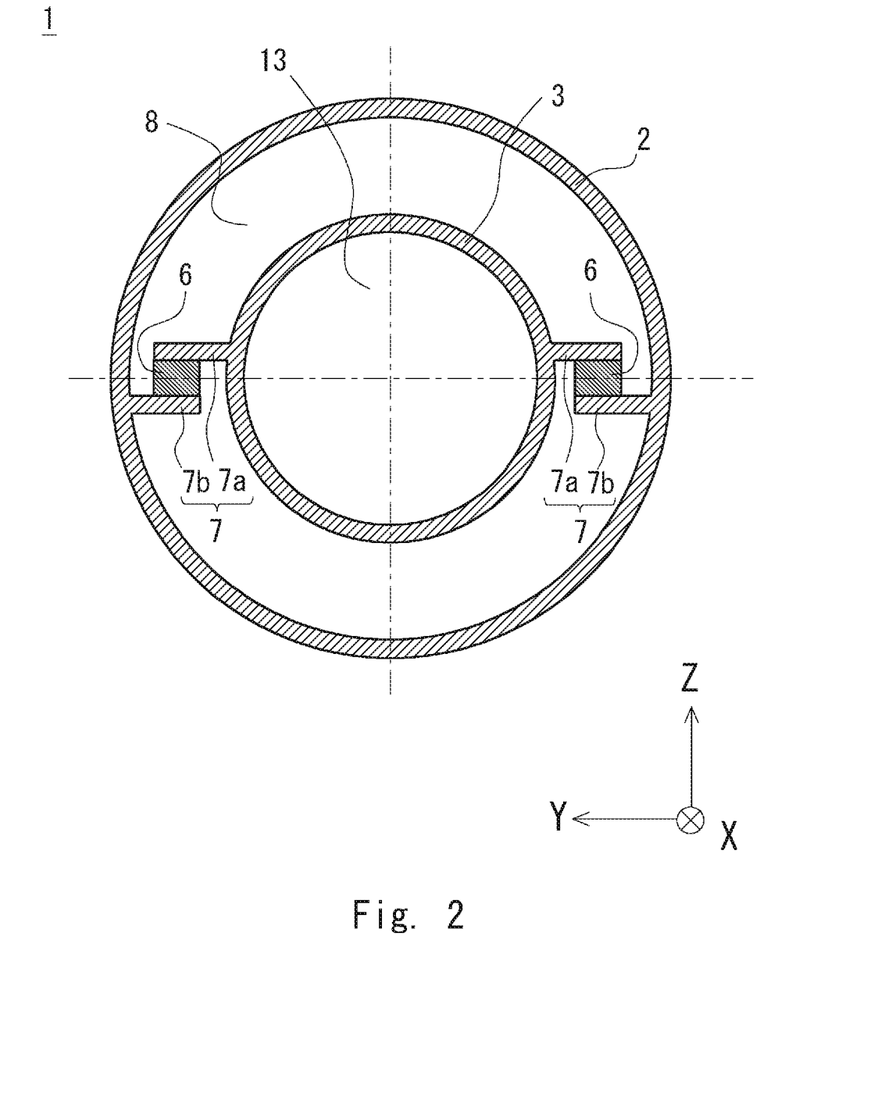
FIG. 2 is a cross-sectional view taken along the line II-II of FIG. 1.

With reference first to FIGS. 1 and 2, a structure of a vacuum heat insulating container 1 according to this embodiment will be explained.

FIG. 1 is a schematic view showing a structure of the vacuum heat insulating container 1. FIG. 2 is a cross-sectional view taken along the line II-II of FIG. 1. As shown in FIGS. 1 and 2, the vacuum heat insulating container 1 includes an outer tube 2 including a bottom and an inner tube 3 that is arranged inside the outer tube 2 and includes a bottom.

The inner tube 3 is arranged inside the outer tube 2 in such a way that the central axis of the inner tube 3 coincides with a central axis L1 of the outer tube 2. Further, the outer tube 2 and the inner tube 3 are arranged in such a way that the central axes thereof are in the horizontal direction. A heating space 13 is inside the inner tube 3. The material of the outer tube 2 and the inner tube 3 is, for example, stainless steel (e.g., SUS304 or SUS316L) or steel. The outer tube 2 and the inner tube 3 are bonded to each other via a ring-shaped bonding part 3e at opening ends of the outer tube 2 and the inner tube 3. According to this structure, a depressurized sealed space 8 is formed between the outer tube 2 and the inner tube 3. The outer tube 2 and the inner tube 3, and the bonding part 3e are bonded to one another by, for example, welding.

A load receiving part 7 includes a first protruding part 7a and a second protruding part 7b. The location of the load receiving part 7 in the vertical direction coincides with the location of the central axis L1 of the outer tube 2. The first protruding part 7a is protruded horizontally on the respective sides of the outer circumference of the inner tube 3. The second protruding part 7b is protruded horizontally on the respective sides of the inner circumference of the outer tube 2 in such a way that the second protruding part 7b is opposed to the first protruding part 7a in the vertical direction. The first protruding part 7a and the second protruding part 7b are extended in the axial direction. An insertion member 6 formed of a material having a thermal conductivity lower than that of the material of the outer tube 2 and the inner tube 3 is inserted between the first protruding part 7a and the second protruding part 7b. The insertion member 6 is formed of, for example, ceramics. Accordingly, the second protruding part 7b provided in the inner circumference of the outer tube 2 receives the load of the inner tube 3 via the first protruding part 7a and the inserting member 6 provided in the outer circumference of the inner tube 3. In this way, the inner tube 3 is supported by the outer tube 2 using the load receiving part 7.

While the first protruding part 7a and the second protruding part 7b are extended in the axial direction from the end part on the opening side to the end part on the bottom side in FIG. 1, this structure is merely one example. The first protruding part 7a and the second protruding part 7b may be extended in a part of the path from the end part on the opening side to the end part on the bottom side along the axial direction. Further, the first protruding part 7a and the second protruding part 7b may be provided in the axial direction at a plurality of positions, for example, two positions: one end and the other end of the inner tube 3 and the outer tube 2.

Next, states of the vacuum heat insulating container 1 before and after heating is performed in the heating space 13 will be explained.

Figure 3:
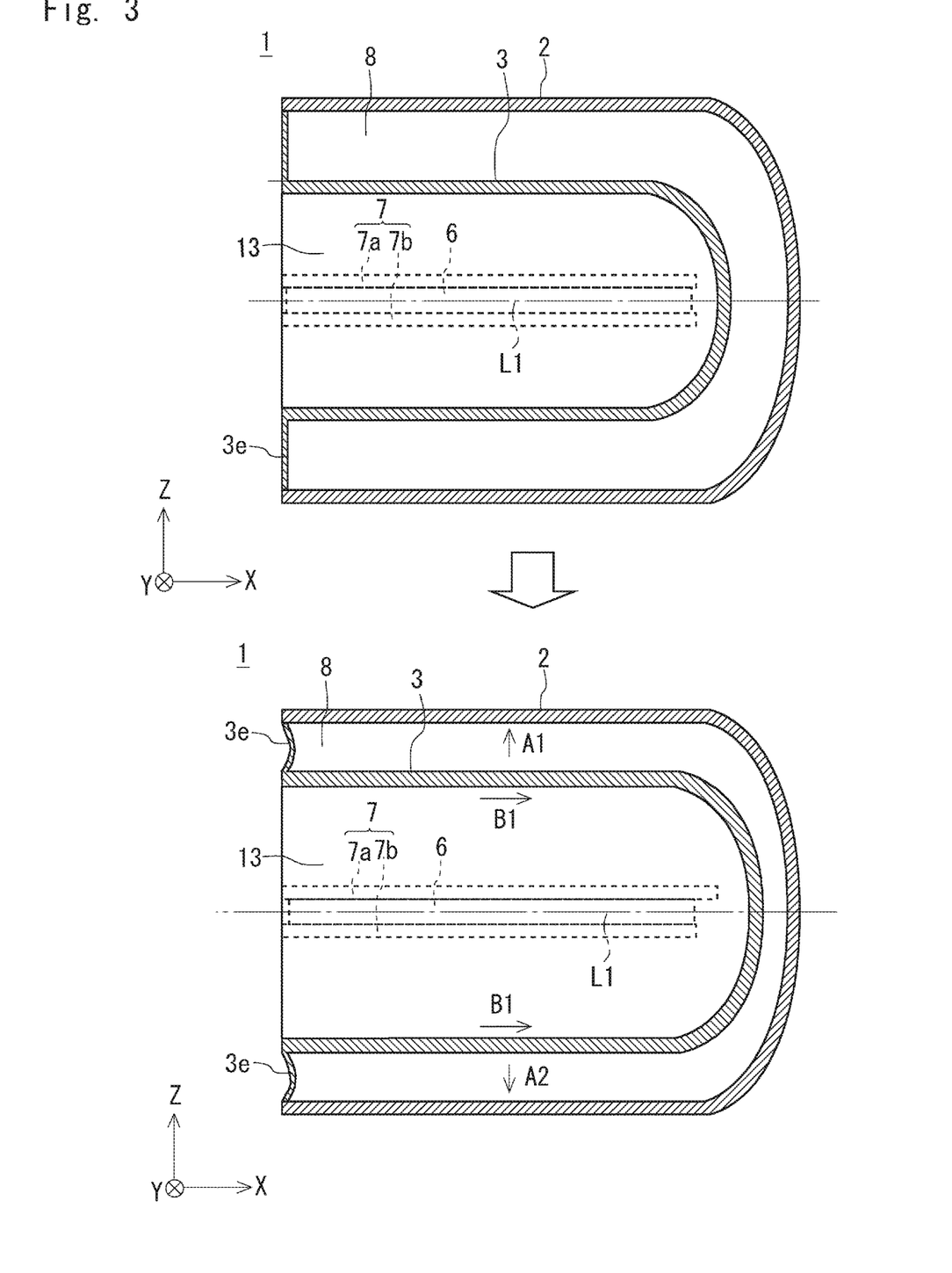
FIG. 3 is a schematic view showing states of the vacuum heat insulating container before and after heating is performed in a heating space of the vacuum heat insulating container according to the first embodiment.

FIG. 3 is a schematic view showing the states of the vacuum heat insulating container 1 before and after heating is performed in the heating space 13. The upper view of FIG. 3 shows a state of the vacuum heat insulating container 1 before heating is performed in the heating space 13 (non-heated state), and the lower view thereof shows a state of the vacuum heat insulating container 1 in which heating is being performed in the heating space 13 (heated state).

As shown in FIG. 3, when heating is performed in the heating space 13, the inner tube 3 is heated and is thermally expanded in the radial direction (arrows A1 and A2) and the axial direction (arrow B1). On the other hand, since the outer tube 2 is thermally insulated from the inner tube 3 by the depressurized sealed space 8, the outer tube 2 barely expands thermally when the inner tube 3 is heated.

As described above, the location of the load receiving part 7 in the vertical direction coincides with the location of the central axis L1 of the outer tube 2. That is, the inner tube 3 is supported by the outer tube 2 using the load receiving part 7 whose location in the vertical direction coincides with the central axis L1 of the outer tube 2. Therefore, when the inner tube 3 is heated, the central axis of the inner tube 3 is maintained to coincide with the central axis L1 of the outer tube 2. Accordingly, when the inner tube 3 is heated, it is thermally expanded to the upper part thereof (arrow A1) and the lower part thereof (arrow A2) in the vertical direction equally, with the load receiving part 7 being at the center of thermal expansion. According to this structure, it is possible to prevent the distortion of the deformation of the inner tube 3 due to thermal expansion from being concentrated in a specific location in the bonding part 3e. Further, even when the vacuum heat insulating container 1 is repeatedly used, damage to the bonding part 3e can be prevented.

From the discussion above, it can be understood that, in the vacuum heat insulating container 1 according to this embodiment, when the inner tube 3 is heated, the inner tube 3 is thermally expanded to the upper part thereof and the lower part thereof in the vertical direction equally, with the load receiving part 7 being at the center of thermal expansion, whereby it is possible to prevent the central axis of the inner tube 3 from being deviated from the central axis L1 of the outer tube 2.

Second Embodiment

Hereinafter, with reference to the drawings, a second embodiment of the present disclosure will be explained.

Figure 4:
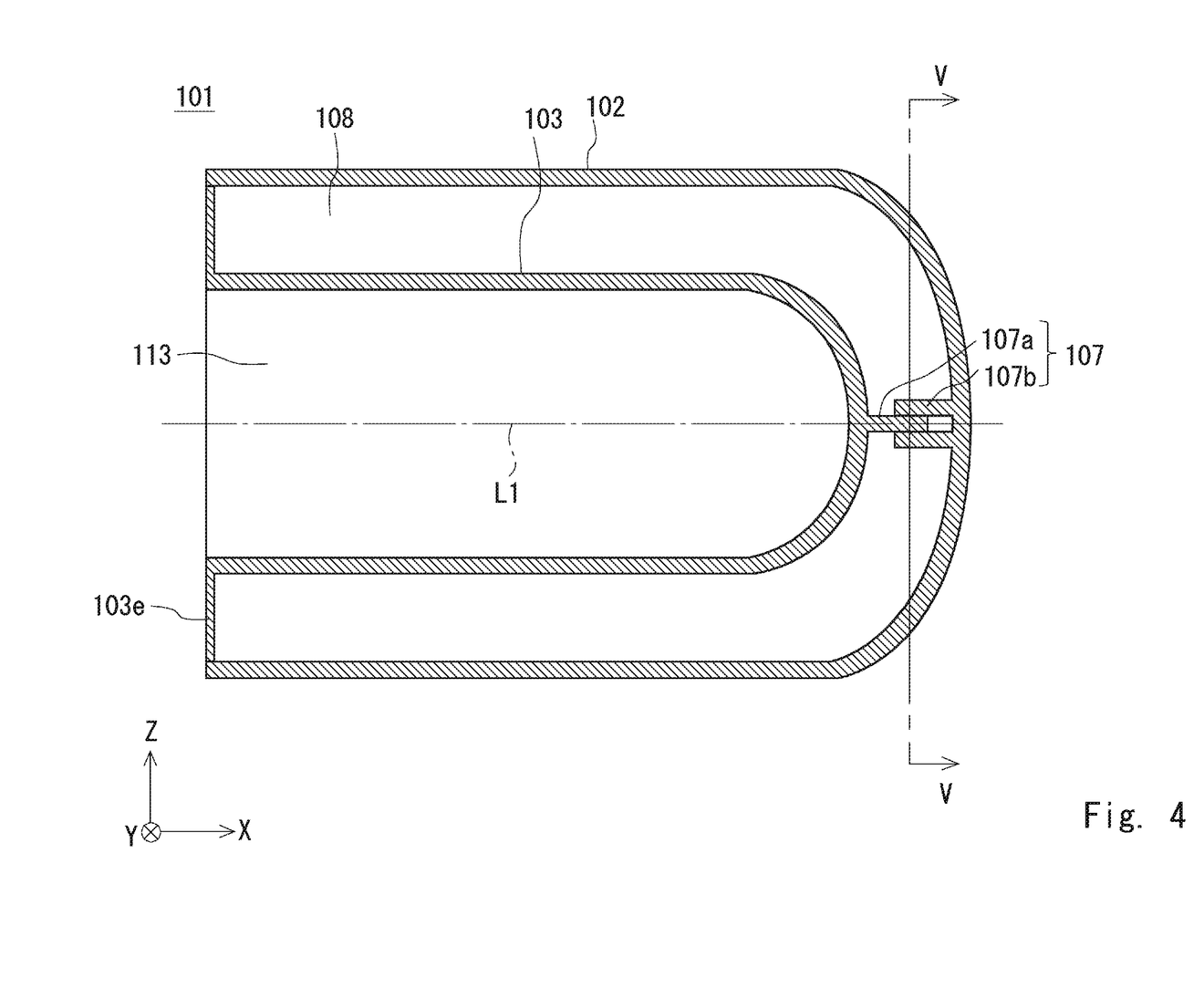
FIG. 4 is a schematic view showing a structure of a vacuum heat insulating container according to a second embodiment.
Figure 5:
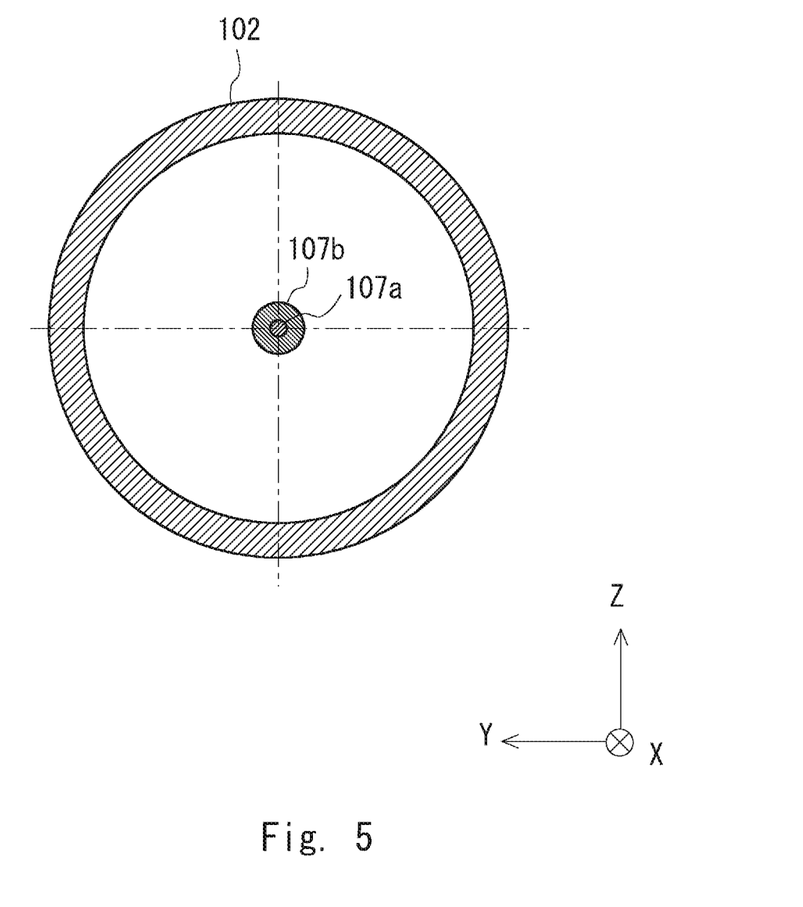
FIG. 5 is a cross-sectional view taken along the line V-V of FIG. 4.

With reference first to FIGS. 4 and 5, a schematic structure of a vacuum heat insulating container 101 according to this embodiment will be explained.

FIG. 4 is a schematic view showing the structure of the vacuum heat insulating container 101. FIG. 5 is a cross-sectional view taken along the line V-V of FIG. 4. As shown in FIGS. 4 and 5, the vacuum heat insulating container 101 includes an outer tube 102 including a bottom and an inner tube 103 that is arranged inside the outer tube 102 and includes a bottom.

The basic structure of the vacuum heat insulating container 101 is the same as the structure of the vacuum heat insulating container 1 according to the first embodiment described with reference to FIGS. 1 and 2. That is, the inner tube 103 is arranged inside the outer tube 102 in such a way that the central axis of the inner tube 103 coincides with the central axis L1 of the outer tube 102, and the outer tube 102 and the inner tube 103 are arranged in such a way that the central axes thereof are in the horizontal direction. The material of the outer tube 102 and the inner tube 103 is, for example, stainless steel (e.g., SUS304, SUS316L) or steel. The outer tube 102 and the inner tube 103 are bonded to each other via a ring-shaped bonding part 103e at opening ends of the outer tube 102 and the inner tube 103, and a depressurized sealed space 108 is formed between the outer tube 102 and the inner tube 103.

The structure and the arrangement of the load receiving part of the vacuum heat insulating container 101 are different from those of the vacuum heat insulating container 1 according to the first embodiment. A load receiving part 107 includes a first protruding part 107a and a second protruding part 107b. The location of the load receiving part 107 in the vertical direction coincides with the location of the central axis L1 of the outer tube 102. The first protruding part 107a, which is a columnar member, protrudes in the axial direction in the bottom part of the outer circumference of the inner tube 103. The second protruding part 107b, which is a cylindrical member, protrudes in the axial direction in the bottom part of the inner circumference of the outer tube 102, and the first protruding part 107a fits into a cylindrical bore of the second protruding part 107b in such a way that it can be slid. The first protruding part 107a provided in the bottom part of the outer circumference of the inner tube 103 fits into the cylindrical bore of the second protruding part 107b provided in the bottom part of the inner circumference of the outer tube 102, whereby the second protruding part 107b receives the load of the inner tube 103 via the first protruding part 107a.

Next, states of the vacuum heat insulating container 101 before and after heating is performed in the heating space 113 will be explained.

Figure 6:
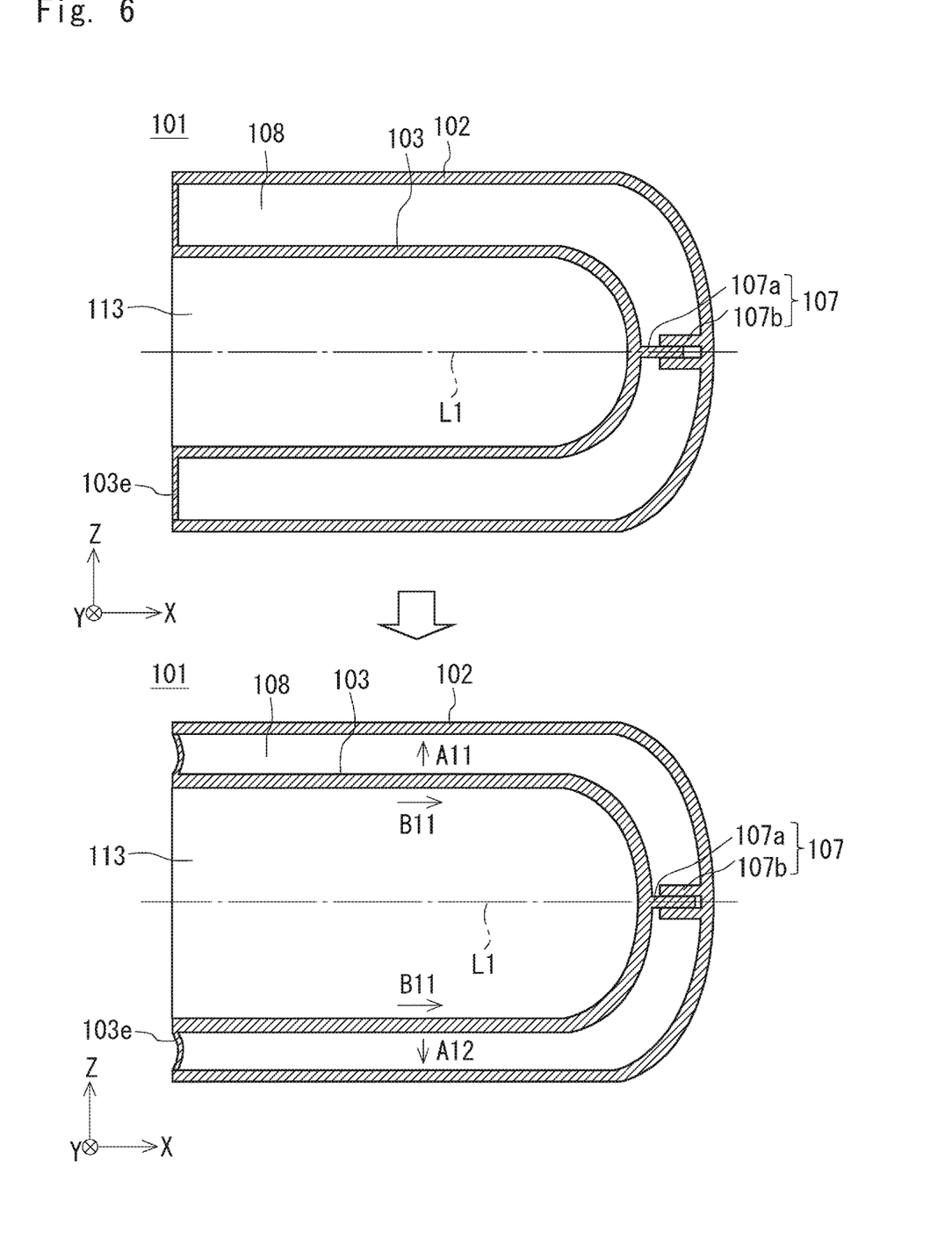
FIG. 6 is a schematic view showing states of the vacuum heat insulating container before and after heating is performed in a heating space of the vacuum heat insulating container according to the second embodiment.

FIG. 6 is a schematic view showing the states of the vacuum heat insulating container 101 before and after heating is performed in the heating space 113. The upper view of FIG. 6 shows a state of the vacuum heat insulating container 101 before heating is performed in the heating space 113 (non-heated state), and the lower view thereof shows a state of the vacuum heat insulating container 101 in which heating is being performed in the heating space 113 (heated state).

As shown in FIG. 6, when heating is performed in the heating space 113, the inner tube 103 is heated and is thermally expanded in the radial direction (arrows A11 and A12) and the axial direction (arrow B11). On the other hand, since the outer tube 102 is thermally insulated from the inner tube 103 by the depressurized sealed space 108, the outer tube 102 barely expands thermally when the inner tube 103 is heated.

As described above, the location of the load receiving part 107 in the vertical direction coincides with the location of the central axis L1 of the outer tube 102. That is, the inner tube 103 is supported by the outer tube 102 using the load receiving part 107 whose location in the vertical direction coincides with the central axis L1 of the outer tube 102. Therefore, when the inner tube 103 is heated, the central axis of the inner tube 103 is maintained to coincide with the central axis L1 of the outer tube 102. Therefore, when the inner tube 103 is heated, the inner tube 103 is thermally expanded to the upper part thereof (arrow A11) and the lower part thereof (arrow A12) in the vertical direction equally, with the load receiving part 107 being at the center of thermal expansion. According to this structure, it is possible to prevent the distortion of the deformation of the inner tube 103 due to thermal expansion from being concentrated in a specific location in the bonding part 103e. Further, even when the vacuum heat insulating container 101 is repeatedly used, damage to the bonding part 103e can be prevented.

From the discussion above, in the vacuum heat insulating container 101 according to this embodiment, when the inner tube 103 is heated, the inner tube 103 is thermally expanded to the upper part thereof and the lower part thereof in the vertical direction equally, with the load receiving part 107 being at the center of thermal expansion, whereby it is possible to prevent the central axis of the inner tube 103 from being deviated with respect to the central axis L1 of the outer tube 102.

Third Embodiment

Hereinafter, with reference to the drawings, a third embodiment of the present disclosure will be explained.

Figure 7:
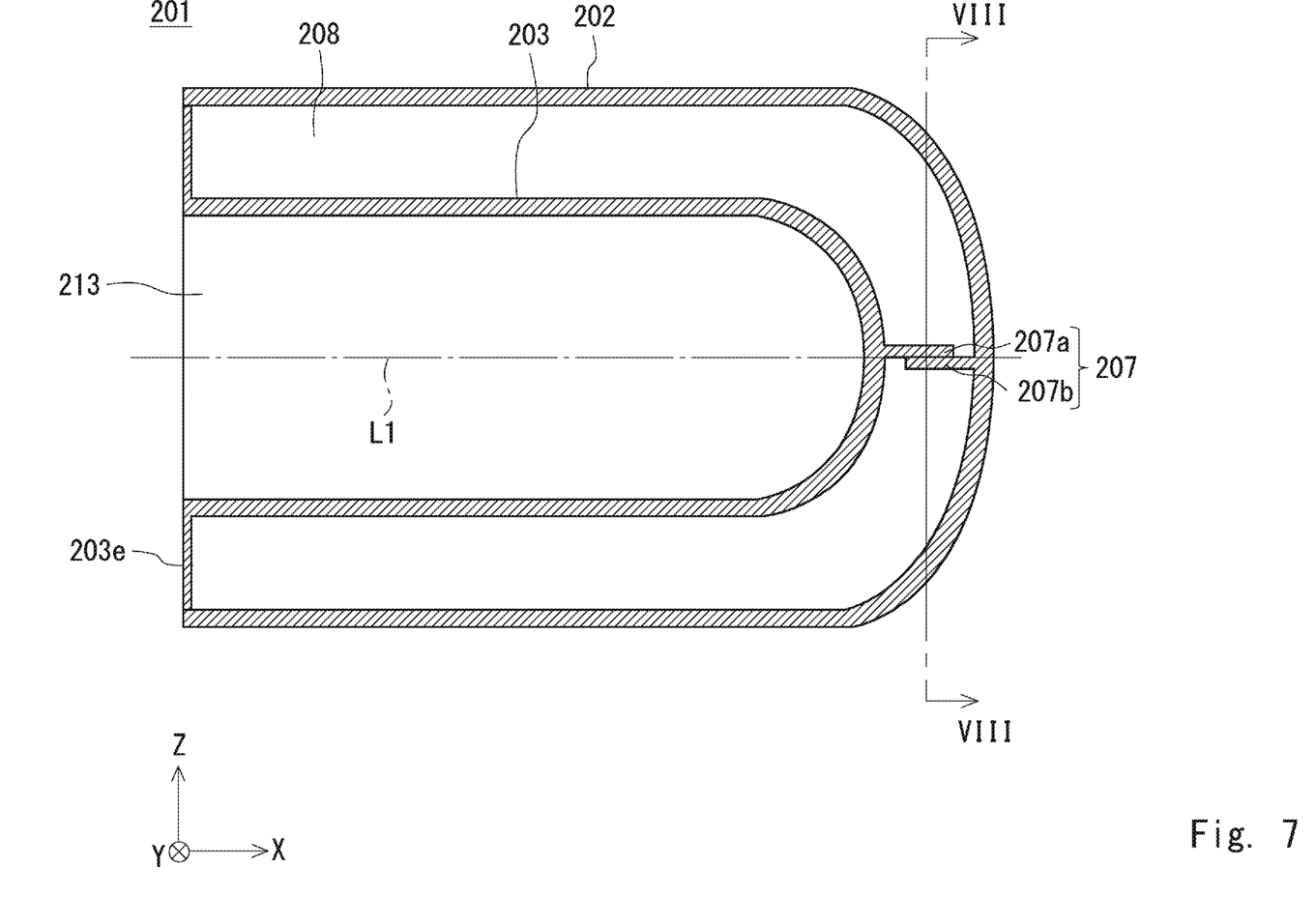
FIG. 7 is a schematic view showing a structure of a vacuum heat insulating container according to a third embodiment.
Figure 8:
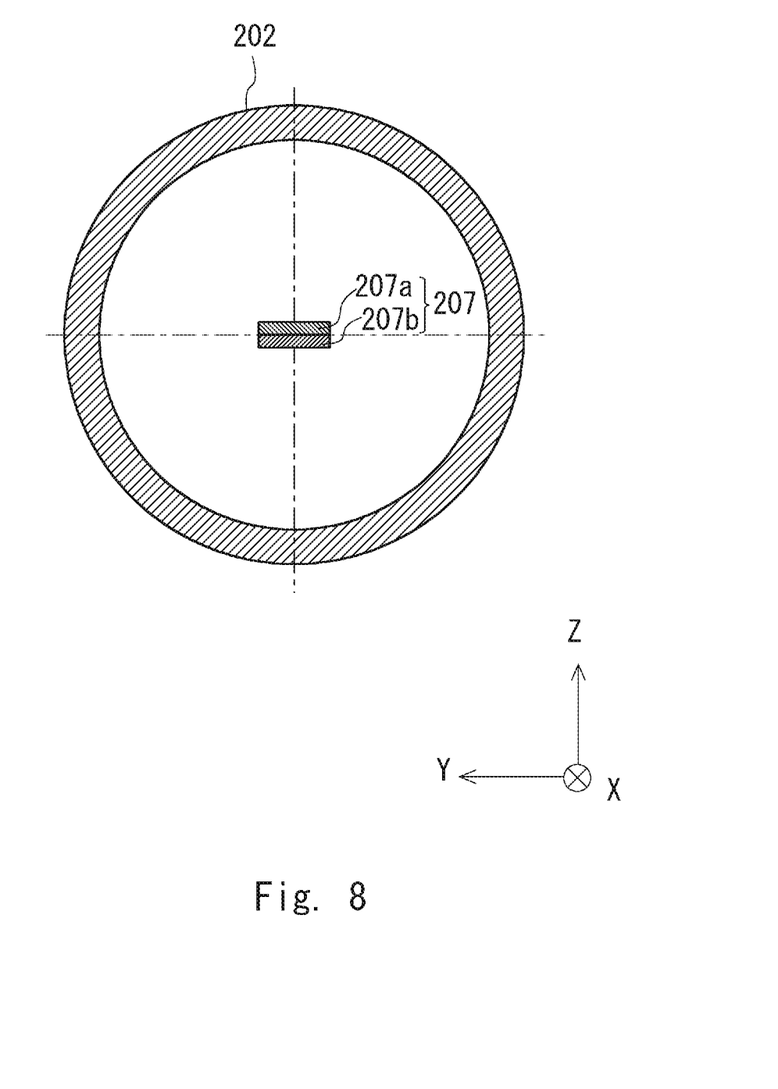
FIG. 8 is a cross-sectional view taken along the line VIII-VIII of FIG. 7.

With reference first to FIGS. 7 and 8, a schematic structure of a vacuum heat insulating container 201 according to this embodiment will be explained.

FIG. 7 is a schematic view showing the structure of the vacuum heat insulating container 201. FIG. 8 is a cross-sectional view taken along the line VIII-VIII of FIG. 7. As shown in FIGS. 7 and 8, the vacuum heat insulating container 201 includes an outer tube 202 including a bottom and an inner tube 203 that is arranged inside the outer tube 202 and has a bottom.

The basic structure of the vacuum heat insulating container 201 is the same as the structure of the vacuum heat insulating container 101 according to the second embodiment described with reference to FIGS. 4 and 5. That is, the inner tube 203 is arranged inside the outer tube 202 in such a way that the central axis of the inner tube 203 coincides with the central axis L1 of the outer tube 202, and the outer tube 202 and the inner tube 203 are arranged in such a way that the central axes thereof are in the horizontal direction. The material of the outer tube 202 and the inner tube 203 is, for example, stainless steel (e.g., SUS304 or SUS316L) or steel. The outer tube 202 and the inner tube 203 are bonded to each other via a ring-shaped bonding part 203e at opening ends of the outer tube 202 and the inner tube 203, and a depressurized sealed space 208 is formed between the outer tube 202 and the inner tube 203.

The only difference between the vacuum heat insulating container 201 and the vacuum heat insulating container 101 according to the second embodiment is the structure of the load receiving part. A load receiving part 207 includes a first protruding part 207a and a second protruding part 207b. The location of the load receiving part 207 in the vertical direction coincides with the location of the central axis L1 of the outer tube 202. The arrangement of the load receiving part in the vacuum heat insulating container 201 is the same as the arrangement of the load receiving part in the vacuum heat insulating container 101. That is, the first protruding part 207a is a plate-like member and is protruded in the axial direction in such a way that the principal surface thereof becomes horizontal in the bottom part of the outer circumference of the inner tube 203. The second protruding part 207b is protruded in the axial direction in such a way that the principal surface thereof is opposed to and contacts the principal surface of the first protruding part 207a in the bottom part of the inner circumference of the outer tube 202. According to this structure, the second protruding part 207b receives the load of the inner tube 203 via the first protruding part 207a.

The inner tube 203 is supported by the outer tube 202 using the load receiving part 207 whose location in the vertical direction coincides with the central axis L1 of the outer tube 202. Therefore, when the inner tube 203 is heated, the central axis of the inner tube 203 is maintained to coincide with the central axis L1 of the outer tube 202. According to this structure, when the inner tube 203 is heated, the inner tube 203 is thermally expanded to the upper part thereof and the lower part thereof in the vertical direction equally, with the load receiving part 207 being at the center of thermal expansion, whereby it is possible to prevent the central axis of the inner tube 203 from being deviated from the central axis L1 of the outer tube 202.

Modified Example 1

Figure 9:
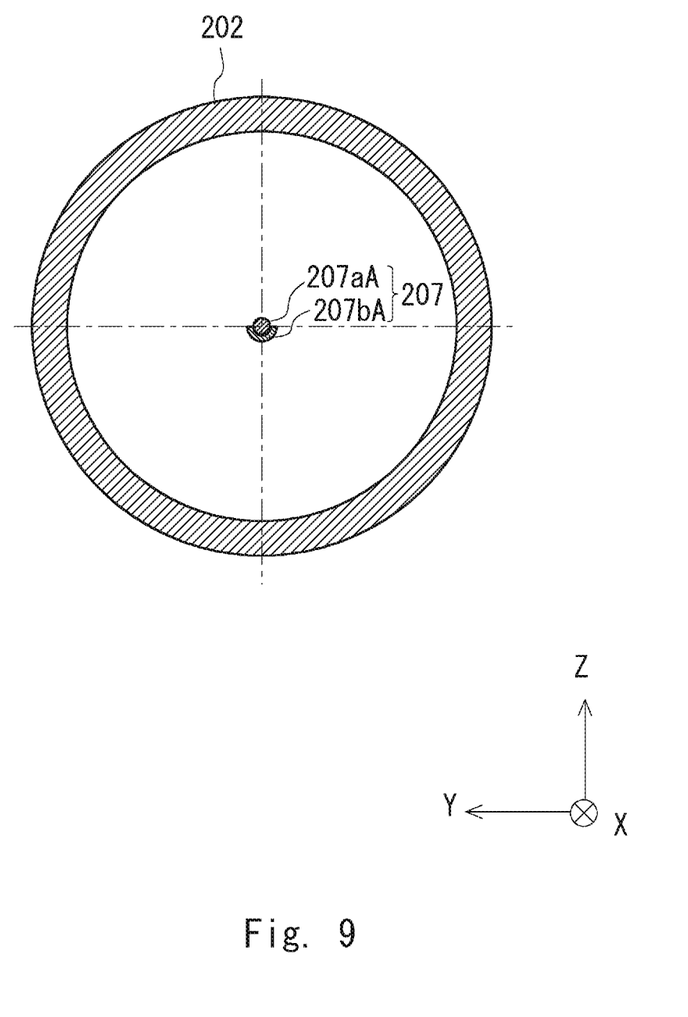
FIG. 9 is a schematic view showing a modified example of a load receiving part in the vacuum heat insulating container according to the third embodiment.

FIG. 9 is a schematic view showing a modified example of the load receiving part 207 of the vacuum heat insulating container 201. As shown in FIG. 9, the load receiving part 207 includes a first protruding part 207aA and a second protruding part 207bA. The first protruding part 207aA, which is a columnar member, protrudes in the axial direction in the bottom part of the outer circumference of the inner tube 203. The second protruding part 207bA, which is a U-shaped member, protrudes in the axial direction in the bottom part of the inner circumference of the outer tube 202 and supports the first protruding part 207aA at a curvature part of the second protruding part 207bA. Accordingly, the second protruding part 207bA receives the load of the inner tube 203 via the first protruding part 207aA.

Note that the present disclosure is not limited to the aforementioned embodiments and may be changed as appropriate without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vacuum heat insulating container comprising an outer tube having a bottom and an inner tube that has a bottom and is arranged inside the outer tube in such a way that a central axis of the inner tube coincides with a central axis of the outer tube, the outer tube and the inner tube being arranged in such a way that the central axes thereof being a horizontal direction, an opening end of the outer tube and an opening end of the inner tube being bonded to each other, the opening end of the outer tube and the opening end of the inner tube being provided on a side opposite to the bottoms thereof, and a depressurized sealed space being formed between the outer tube and the inner tube, wherein
   the inner tube and the outer tube have a U-shaped cross section,
   the inner tube is heated,
   the vacuum heat insulating container further comprises a load receiving part for causing the outer tube to support the inner tube,
   the location of the load receiving part in a vertical direction coincides with the location of the central axis of the outer tube, and
   the load receiving part comprises a first protruding part that protrudes in an outer circumference of the inner tube and a second protruding part that protrudes in an inner circumference of the outer tube and receives the load of the inner tube via the first protruding part.

2. The vacuum heat insulating container according to claim 1, wherein
   the first protruding part is protruded horizontally on respective sides of the outer circumference of the inner tube,
   the second protruding part is protruded horizontally on respective sides of the inner circumference of the outer tube in such a way that the second protruding part is opposed to the first protruding part in a vertical direction,
   an insertion member formed of a material having a thermal conductivity lower than that of the material of the outer tube and the inner tube is inserted between the first protruding part and the second protruding part, and
   the second protruding part receives the load of the inner tube via the first protruding part and the insertion member.

3. The vacuum heat insulating container according to claim 1, wherein
   the first protruding part is a columnar member and is protruded in an axial direction in a bottom part of the outer circumference of the inner tube,
   the second protruding part is a cylindrical member and is protruded in an axial direction in a bottom part of the inner circumference of the outer tube, and
   the first protruding part is fitted into a cylindrical bore of the second protruding part in such a way that it can be slid.

4. The vacuum heat insulating container according to claim 1, wherein
   the first protruding part is a plate member and is protruded in an axial direction in such a way that a principal surface of the first protruding part becomes horizontal in a bottom part of the outer circumference of the inner tube, and
   the second protruding part is protruded in the axial direction in such a way that a principal surface of the second protruding part is opposed to and contacts the principal surface of the first protruding part in a bottom part of the inner circumference of the outer tube.

5. The vacuum heat insulating container according to claim 1, wherein
   the inner tube is heated to at least 1000° C.

* * * * *